(12) United States Patent
Fessler et al.

(10) Patent No.: US 6,668,978 B2
(45) Date of Patent: Dec. 30, 2003

(54) OIL SUPPLYING SYSTEM FOR AN AUTOMATIC TRANSMISSION WITH A HYDRODYNAMIC STARTING DEVICE

(75) Inventors: Bernd Fessler, Kressbronn (DE); Friedrich Reiter, Kressbronn (DE)

(73) Assignee: ZF Batavia L.L.C., Batavia, OH (US)

( * ) Notice: Subject to any disclaimer, the term of this patent is extended or adjusted under 35 U.S.C. 154(b) by 82 days.

(21) Appl. No.: 09/938,180

(22) Filed: Aug. 23, 2001

(65) Prior Publication Data

US 2003/0066710 A1 Apr. 10, 2003

(30) Foreign Application Priority Data

Sep. 7, 2000 (DE) ......................................... 100 44 177

(51) Int. Cl.$^7$ ............................................... F01M 9/00
(52) U.S. Cl. .......................... 184/6.1; 74/467; 192/3.29
(58) Field of Search .......................... 184/6.1; 192/3.24, 192/3.25–3.33; 74/467

(56) References Cited

U.S. PATENT DOCUMENTS

| | | | | | |
|---|---|---|---|---|---|
| 3,730,315 A | * | 5/1973 | Annis et al. | ............... | 192/3.3 |
| 3,893,551 A | * | 7/1975 | Ahlen | ........................ | 192/3.33 |
| 4,147,242 A | * | 4/1979 | Fujioka | ...................... | 192/220 |
| 4,181,203 A | * | 1/1980 | Malloy | ........................ | 192/3.3 |
| 4,462,492 A | * | 7/1984 | Mueller | ..................... | 192/3.29 |
| 4,640,396 A | * | 2/1987 | Nishimura | ................. | 192/3.31 |
| 4,662,488 A | * | 5/1987 | Hiramatsu et al. | ......... | 192/3.58 |
| 4,669,336 A | * | 6/1987 | Okada et al. | ................ | 477/48 |
| 4,718,308 A | * | 1/1988 | Haley | ........................ | 477/39 |
| 4,828,084 A | * | 5/1989 | Hasegawa et al. | ........... | 192/3.3 |
| 4,846,765 A | * | 7/1989 | Sakai | .......................... | 474/28 |
| 4,951,788 A | * | 8/1990 | Martin | ........................ | 192/3.3 |
| 5,090,527 A | * | 2/1992 | Imamura et al. | ........... | 192/3.29 |
| 5,273,492 A | * | 12/1993 | Kashiwase et al. | ........... | 474/43 |
| 5,305,862 A | * | 4/1994 | Gierer | ........................ | 192/3.3 |
| 5,417,315 A | * | 5/1995 | Fukunaga | ..................... | 192/3.3 |
| 5,605,513 A | * | 2/1997 | Van Der Hardt Aberson | | 474/43 |
| 5,624,341 A | * | 4/1997 | Park | ............................ | 475/119 |
| 5,667,458 A | * | 9/1997 | Narita et al. | ................ | 477/169 |
| 5,669,473 A | * | 9/1997 | Long et al. | .................. | 192/3.3 |
| 5,669,479 A | * | 9/1997 | Matsufuji | ................. | 192/87.15 |
| 5,700,226 A | * | 12/1997 | Droste | ........................ | 477/156 |
| 5,701,982 A | * | 12/1997 | Nakatani et al. | ............. | 192/3.3 |
| 5,752,895 A | * | 5/1998 | Sugiyama et al. | .......... | 477/169 |
| 5,947,865 A | * | 9/1999 | Watanabe et al. | ........... | 477/169 |
| 6,068,569 A | * | 5/2000 | Redinger et al. | ........... | 475/159 |

FOREIGN PATENT DOCUMENTS

DE           19902408        * 8/2000

* cited by examiner

Primary Examiner—David A. Bucci
Assistant Examiner—Julie K. Smith
(74) Attorney, Agent, or Firm—Davis & Bujold, PLLC

(57) ABSTRACT

The invention concerns an oil supply system for an automatic transmission of a motor vehicle having one hydrodynamic starting element. It has one oil pump (2) to convey oil to a variator (9, 10) and/or to shifting elements (12, 13), to a converter unit (19) that can be supplied with oil via two oil lines (23, 25), especially a hydrodynamic torque converter (20) having a converter lock-up clutch (21), and to a lubrication device (28), the same as at least one filter device (3, 31) and one oil cooling device (17). Here are provided one prioritized primary circuit (6) with a main pressure adjusted by a main pressure valve (3) for pressure supply of the variator (9, 10) and/or of the shifting elements (12, 13) and a secondary circuit (7) for oil supply of the lubrication device (28). It is proposed according to the invention that the converter unit (19) be tied to the primary circuit (6) and to the secondary circuit (7) so that the converter lock-up clutch (21) be supplied with a minimum pressure required for torque transmission via the primary circuit (6) parallel to the supply of the lubrication device (28) via the secondary circuit (7) when on the converter lock-up clutch (21) a closing or slipping state is adjusted and that otherwise the converter unit (19) is supplied with oil via the secondary circuit (7).

10 Claims, 1 Drawing Sheet

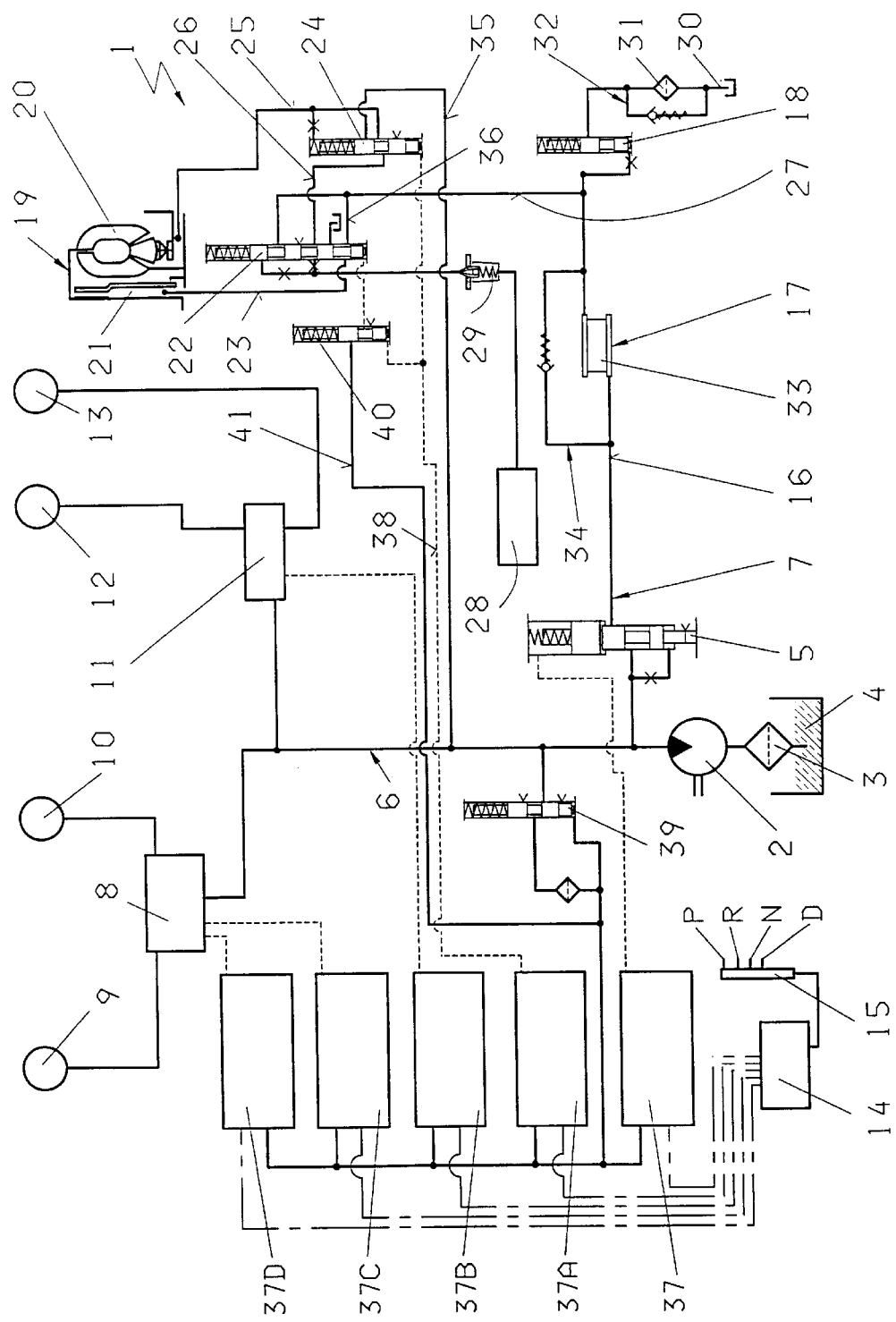

OIL SUPPLYING SYSTEM FOR AN AUTOMATIC TRANSMISSION WITH A HYDRODYNAMIC STARTING DEVICE

FIELD OF THE INVENTION

The invention concerns an oil supply system for an automatic transmission of a motor vehicle with one hydrodynamic starting device.

BACKGROUND OF THE INVENTION

It is known that automatic transmission in motor vehicles use oil for the hydrodynamic transmission of force and power, hydrostatic transmission of force and power, for information processing, for modulation of friction values, lubrication, heat emission and power consumption. As oil supply system serves here an oil circuit which, as a rule, is comprised of an oil sump, an oil filter, an oil pump, control valves, actuators of servoelements, seals, an oil cooler and connecting lines. Via the oil circuit oil volume is passed as pressure medium to shifting elements or for adjustment of variator disks of a variator in CVT transmission, to a converter unit consisting of a hydrodynamic torque converter and a converter lock-up clutch and to a lubrication device by means of which are lubricated or cooled, for example, the bearings of the many shafts, hollow shafts and webs of the planetary sets and servo-organs.

In the automatic transmissions known from the practice, the oil circuit is divided by a main pressure valve in a prioritized primary circuit and a secondary circuit. In a CVT transmission, the primary circuit contains here the pressure supply of the variator disks and shifting elements; in a multi-step transmission usually only the pressure supply of the shifting elements. The pressure of the primary circuit is determined by the main pressure valve, the consumers of the primary circuit being mutually equalized. Compared to the consumers of the primary circuit, the consumers of the secondary circuit have a lower priority in the provision of pressure.

On the primary side of the main pressure valve, when there is an excess of oil volume, the excess oil is sprayed off to the secondary circuit. The secondary circuit usually contains, together with the supply of the lubrication and the pressure supply of the torque converter, the pressure supply of the converter lock-up clutch when the torque converter is attached with its lock-up clutch to the oil supply in the two-line technique. In the known automatic transmissions, the pressure of the secondary circuit is determined by a converter safety valve designed as pressure-limiting valve. The consumers of the secondary circuit are mutually equalized to a pressure level above the predetermined lubrication pressure which is usually adjusted by a separate pressure-limiting valve. In such an arrangement, the main pressure cannot be below the maximum pressure level of the secondary circuit.

The pressure level of the secondary circuit is determined by the required pressure of the converter lock-up clutch when maximum torque is to be transmitted. It is disadvantageous here that in certain operating ranges the minimum main pressure in the primary circuit is determined by the pressure level of the secondary circuit even though for pressure supply of the consumers in the primary circuit a lower pressure level would suffice, for example, in case of small load or open drive train. Deterioration in effectiveness and consumption disadvantages accordingly result.

Although, as a rule, there is an oil oversupply of the primary circuit in operating situations needing a large oil volume in the primary circuit, such as in the case of large adjustment gradients of the variator in a CVT transmission, a brief undersupply in oil volume of the secondary circuit can occur so that the pressure level required does not build up in the secondary circuit. In the case of such an undersupply of the secondary circuit, the pressure in the converter lock-up clutch can drop to lubrication pressure which entails a slipping of the converter lock-up clutch. Due to the high rotation of the primary mover, a loss of comfort also results together with an undesirable wear of the converter lock-up clutch.

Together with the provision of a sufficient oil volume flow for building up a required pressure, the oil supply system in the automatic transmission also has the important function of taking care that the oil in the transmission is cooled in order to be able to remove as heat the power loss generating in the transmission. For this purpose, an oil-cooling device is, as a rule, situated before the lubrication in the secondary circuit wherefore the transmission elements are usually cooled via the supply of lubrication oil. The converter unit is conveniently disposed before the lubrication, since it needs a higher pressure level than the lubrication. To prevent an overpressure in the converter unit, the converter safety valve usually has an oil spray-off edge for discharging excessive oil volume in the oil sump. Consequently, the excessive oil is not cooled which results in a corresponding increase of temperature in the oil sump.

Therefore, the problem on which this invention is based is to make an oil supply system available for an automatic transmission of a motor vehicle, having one oil circuit divided by a main pressure valve into one primary circuit and one secondary circuit with which system can be effectively implemented by adjustment of the lowest possible main pressure, the pressure supply of a converter unit being always ensured. In addition, the oil supply system must make an effective cooling of the circulating oil possible.

According to the invention this problem is solved by an oil supply system.

SUMMARY OF THE INVENTION

Therefore, according to the invention, it is proposed to supply the converter lock-up clutch in the operating situations in which it is to be brought to a closing or slipping state with oil, via the primary circuit, with a required minimum pressure while oil is fed to the lubrication device, via the secondary circuit. Otherwise, the converter unit is bound to the secondary circuit.

In a especially advantageous manner, the pressure to be adjusted for the converter unit during the supply through the secondary circuit can be reduced to the cavitation limit of the converter. The inventive tying of the converter lock-up clutch to the primary circuit makes an optimum pressure design on the secondary circuit in the operating states possible with open converter lock-up clutch.

The converter unit is, therefore, always conveniently suppled with enough oil volume while the main pressure in the primary circuit can be below the pressure needed for the closing of the converter clutch, for example, in case of small load. An improved degree of efficiency can be conveniently implemented and thus an economy in fuel.

At the same time, the inventive oil supply system can be used both in multi-step automatic transmissions and in CVT transmission. The inventive oil supply system can, likewise, be used for any hydrodynamic starting elements in combination with an appertaining lock-up clutch, such as a torque converter with integrated lock-up clutch.

For the effective cooling of the oil circulating in the transmission, it is proposed to situate the inventive oil supply system in the secondary circuit in flow direction behind the main pressure valve and before the converter unit, before the lubrication device and before an oil spray-off device for discharging excess of oil volume in the secondary circuit. The cooling of the whole system is hereby improved in the sense that the oil already sprayed off in the oil sump during the pressure adjustment on the converter unit also has passed through the cooling device.

BRIEF DESCRIPTION OF THE DRAWING

Other advantageous developments of the invention will now be described, by way of example, with reference to the single drawing.

DETAILED DESCRIPTION OF THE INVENTION

The oil supply system 1, shown in the figure by way of example, is provided for a CVT automatic transmission of a motor vehicle. The inventive tying described therein of the converter unit evidently can also be used in the electrohydraulic control of a multi-step automatic transmission. With 2 is designated an oil pump which, via an oil filter device designed as suction filter 3, conveys oil from an oil sump 4 to a main pressure valve 5. In one other embodiment, instead of the suction filter, a pressure filter can be provided with a correspondingly different tying in the pressurized oil circuit. The main pressure valve 5 divides the oil amount conveyed by the oil pump 2 in a primary circuit 6 and a secondary circuit 7.

In another embodiment, the pressure oil of primary and secondary circuits 6, 7 can also be supplied, e.g. via several oil pumps, with an additional low-pressure lubrication oil pump in the secondary circuit 7 or with a separate high-pressure pump for supply of the primary circuit 6 and a separate low-pressure pump for supply of the secondary circuit 7.

The primary circuit 6 leads, via a first valve device 8, only symbolically indicated in the figure, to a first variator disk 9 and to a second variator disk 10 of a variator of the CVT transmission (not shown in detail). Besides, the primary circuit 6 supplies, via a second valve device 11, also indicated only, different shifting elements of which one shifting element 12 serves for reverse travel and one shifting element 13 for forward travel.

The variator disks 9, 10 and the shifting elements 12, 13, the same as a converter unit 19, are hydraulically controlled in a manner known per se via electrohydraulic pressure-adjusting devices 37A to 37D which convert in hydraulic pressures electric signals sent by an electronic transmission control 14. The main pressure is adjusted on the main pressure valve 5 in the same way using a system pressure adjustment device 37. The electronic transmission control 14 is designed and connected with a position switch 15 for adjusting shifting positions like "P" for parking of the vehicle, "R" for reverse drive, "N" for idling and "D" for forward drive, the same as optionally other shifting positions.

The secondary circuit 7 only supply with oil when the oil pump 2 feeds to the primary circuit 6 more oil volume than it consumes. This priority is produced in the main pressure valve 5 by adequate design of the control edge. The secondary circuit 7 to which is, therefore, removed the excessive oil volume from the primary circuit 6 has a first oil line 16 leading away from the main pressure valve 5 to a cooling device 17. AN oil line 27 then leads the oil from the cooling device 17 to a converter pressure valve 22. The pressure in the oil line 22 is limited by a converter safety valve 18 which especially protects against a rear-mounted converter unit 19 being over-pressured.

In another embodiment, it can be provided that the cooling device 17 be not situated in oil flow direction directly behind the main pressure valve 5, but in another place in the secondary circuit 7, e.g. in flow direction immediately before the lubrication device 28. Several cooling devices, independent of each other, can obviously be integrated in the transmission oil circuit.

The converter unit 19, which has a hydrodynamic torque converter 20 with an integrated converter lock-up clutch 21, is tied for oil supply in a two-line technique to the transmission oil economy and is controlled, via the converter pressure valve 22 and a converter clutch valve 24. To this end, the converter unit 19 is connected via an oil line 23 with the converter pressure valve 22 and via an oil line 25 with the converter clutch valve 24. An oil line 26 connects the converter clutch valve 24 with the converter pressure valve 22.

Instead of the torque converter 20 with its lock-up clutch 21, there also can be provided any other hydrodynamic starting elements connected with an appertaining lock-up clutch and an oil tie via two oil lines 23 and 25, e.g. a hydrodynamic clutch with integrated lock-up clutch.

When the converter lock-up clutch 21 should be open, the pressure is lowered in a control line 38 by the electrohydraulic pressure-adjustment device 37A until a converter pressure-shifting valve 40 shifts the converter pressure valve 22 so that the oil flows toward the torque converter 20, via the oil line 27, the converter pressure valve 22 and the oil line 23. In this operating state, the oil flows from the oil line 23 through the hydrodynamic circuits of the torque converter 20 to the oil line 25. The converter clutch valve 24 is shifted by the pressure into the control line 38 so that the further oil conduction proceeds from the oil line 25 through the converter clutch valve 24, via an oil line 26, through the converter pressure valve 22, through a plate valve 29 to a lubrication device 28. Between the converter pressure valve 22 is provided the plate valve 29 and the lubrication device 28 should prevent the torque converter 20 from running idle to stoppage and can evidently have a different construction design. The lubrication device 28 for the supply of lubrication oil of different parts of the transmission is shown only symbolically and can be designed as known per se.

If the converter lock-up clutch 21 should now be brought from the open to a torque-transmitting state or transmit torque, the oil flow direction is turned around to the converter unit 19 designed as a two-line converter. To this end, the pressure in the control line 38 is raised by the electrohydraulic pressure-setting device 37D to the extend that converter pressure-shifting valve 40, converter pressure valve 22 and converter clutch valve 24 shift in a manner such that the oil flow from the oil line 27 to the oil line 23 is interrupted, that the oil line 23 on the converter pressure valve 22 is vented, that the oil flows from the oil line 27 via the converter pressure valve 22 to the plate valve 29 and further to the lubrication device 28, that the oil line 26 on the converter pressure valve 22 is locked, that the converter lock-up clutch 21 via an oil line 25 and the converter clutch valve 24 are supplied with pressurized oil. According to the invention, the oil line 35 is tied here to the primary circuit 6.

In another embodiment of the hydraulic control of the converter pressure valve 22, it can also be provided directly to control the latter by the electrohydraulic pressure-setting device 37A via the control line 38 without a front-mounted converter pressure-shifting valve 40.

In operating states, where the converter lock-up clutch 21 is controlled or transmits torque, the pressure on the converter lock-up clutch 21 is adjusted via the converter clutch valve 24. The now pressureless side of the converter lock-up clutch 21 is relieved of pressure via the line 23 leading to the converter pressure valve 22 and vent 36 situated on the converter pressure valve 22. Via the vent 36, the oil throughput is also led back to the oil sump 4 by the slipping or closed converter lock-up clutch 21.

Therefore, it is essential to the invention that the converter lock-up clutch 21 is not tied on the pressure side to the secondary circuit 7 but to the primary circuit 6 the pressure level of which can be adapted to the torque to be transmitted by the transmission via the electrohydraulic system pressure-adjusting device 37 and the main pressure valve 5. The lubrication device 28 is always supplied with oil, via the secondary circuit 7, independently of the shifting state of the converter lock-up clutch 21, specifically when the converter lock-up clutch 21 is open with through flow of the torque converter 20 and when the converter lock-up clutch 21 is shifted directly via the converter pressure valve 22 and without through flow of the torque converter.

The parallel hydraulic tying of the lubrication device 28 to the secondary circuit 7 for the hydraulic tying of the converter lock-up clutch 21 to the primary circuit 6 during closing, slipping or closed converter lock-up clutch 21 makes adjusting the height of the supply pressure of the lubrication device 28 absolutely independently of the height of the pressure needed by the converter lock-up clutch 21 for its torque transmission. Here the height of the supply pressure of the lubrication device 28 is limited by the converter safety valve 18.

In case the secondary circuit 7 were fed a volume flow too great for the converter unit 19, the excess of oil volume is discharged via the converter safety valve 18 and an oil spray-off device 30 designed as spray-off edge. At the same time, via the oil spray-off device 30, it is possible to discharge enough oil in a specially convenient manner by the converter safety valve 18 so that the pressure adjusted in the converter unit 19 can be reduced to the cavitation limit of the torque converter 20.

In the embodiment shown, a pressure filter 31 is situated between the converter safety valve 18 and the spray-off edge 30. To prevent overpressure in the system, e.g. as result of clogging of the filter, parallel to the pressure filter 31 is mounted a bypass device 32 with an overpressure valve. The arrangement of such a filter system as rear-mounted element after the converter safety valve 18 is in particular convenient, since the technically determined pressure drop via the filter system to the minimum pressure level of the system has no influence. The required power of the oil pump 2 is, accordingly, lower than when the pressure filter 31 is disposed in the flow range before the converter safety valve 18. Besides, the suction filter 3 of the oil pump 2 can be designed coarse-pored due to the filtering action of the additional pressure filter 31, since an effective oil cleansing is ensured even at high pressures with the pressure filter technology known per se.

The oil removed via the spray-off edge 30 is already cooled by virtue of the specially convenient arrangement shown in the figure of the oil cooling device 17 between the main pressure valve 5 and the converter safety valve 18. The oil cooling device 17 conveniently comprises together with a heat-exchanger 33 a bypass device 34 with an overpressure valve. The bypass device 34 serves to limit the pressure drop of the oil passing through the cooling device 17, especially of highly viscous oil due to lower temperature, or also in case of clogging of the heat exchanger 33.

References 1 oil supply
2 oil pump
3 suction filter of the oil pump
4 oil sump
5 main pressure valve
6 primary circuit
7 secondary circuit
8 first valve device in the primary circuit
9 first variator disk
10 second variator disk
11 second valve device in the primary circuit
12 shifting element reverse drive
13 shifting element forward drive
14 electronic transmission control
15 position switch
16 oil line in the secondary circuit behind the main pressure valve
17 cooling device
18 converter safety valve
19 converter unit
20 hydrodynamic torque converter
21 converter lock-up clutch
22 converter pressure valve
23 oil line between converter pressure valve and converter unit
24 converter clutch valve
25 oil line between converter clutch valve and converter unit
26 oil line between converter pressure valve and converter clutch valve
27 oil line to converter pressure valve
28 lubrication device
29 plate valve
30 oil spray-off device, spray-off edge
31 pressure filter
32 bypass device with overpressure valve for the pressure filter
33 heat-exchanger of the cooling device
34 bypass device with overpressure valve for the heat exchanger
35 oil line from the primary circuit to the converter clutch valve
36 vent of the converter pressure valve
37 electrohydraulic system pressure setting device
37A electrohydraulic pressure setting device for the converter lock-up clutch
37B electrohydraulic pressure setting device for the second valve device in the primary circuit
37C electrohydraulic pressure setting device for the first valve device in the primary circuit
37D electrohydraulic pressure selling device for the first valve device in the primary circuit
38 control line of the electrohydraulic pressure setting device for the converter lock-up clutch
39 pressure-reducing valve
40 converter pressure-shifting valve
41 oil line to converter pressure-shifting valve
D shifting position for forward drive
N shifting position for idling
P shifting position for parking
R shifting position for reverse

What is claimed is:

1. An oil supply system for an automatic transmission of a motor vehicle comprising:
   at least one oil pump (2) and an oil filter device (3, 31) for conveying oil from an oil sump (4) to:
      a primary oil circuit (6) having a primary pressure adjusted by a main pressure valve (5); and
      a secondary oil circuit (7) having a secondary pressure that is a proportion of the primary pressure;
   a variator (9, 10) and at least one shifting element (12, 13) connected with the primary oil circuit (6);
   a lubrication device (28) connected with the secondary oil circuit (7); and
   a converter unit (19) including one of a hydrodynamic torque converter (20) with a converter lock-up clutch (21) and a hydrodynamic clutch with a lock-up clutch;
   wherein, when the converter unit (19) is in a torque transmission state, the lock-up clutch is supplied with a minimum pressure required for torque transmission through the primary oil circuit (6) and the lubrication device (28) is provided with oil through the secondary circuit (7); and
   when the converter unit (19) is in the open state, the lock-up clutch is provided with oil through the secondary oil circuit (7).

2. The oil supply system according to claim 1, wherein a converter pressure valve (22) and a converter clutch valve (24) are provided for oil supply of the converter unit (19), the lock-up clutch (21) of the converter unit (19) is supplied with a minimum pressure required for torque transmission in the converter lock-up clutch (21) through the primary circuit (6) and, in parallel with the supply of oil to the lubrication device (28), through the secondary circuit (7) when the lack-up clutch (21) is in one of an engaged and a slipping state, and otherwise the converter unit (19) is supplied with oil via the secondary circuit (7).

3. The oil supply system according to claim 1, wherein the converter unit (19) is front-mounted on the lubrication device (28), and a converter safety valve 18) is provided for adjusting the supply pressure in the converter unit (19.

4. The oil supply system according to claim 1, wherein, when the lock-up clutch (21) is supplied via the primary circuit (6), the pressure level of the lubrication device (28) is adjusted via the converter safety valve (18).

5. The oil supply system according to claim 3, wherein the converter safety valve (18) is front-mounted on an oil spray-off device (30) for discharging excessive volume of oil in the secondary circuit (7).

6. The oil supply system according claim 2, wherein the oil cooling device (17) is situated in the secondary circuit (7) downstream of the main pressure valve (5) and upstream of the converter unit (19), the lubrication device (28) and the converter safety valve (18).

7. The oil supply system according to claim 1, wherein the oil cooling device (17) has a bypass device (34) for limiting a pressure drop of the oil that passes through the oil cooling device (17).

8. The oil supply system according to claim 1, wherein, in addition to a suction filter (3) situated upstream of the at least one oil pump (2), a pressure filter 31) is situated downstream of the converter safety valve (18), in the secondary circuit 7), to filter the all and the pressure filter (31) functions as an oil filter device and has a bypass device (32) with an overpressure valve.

9. An oil supply system for an automatic transmission of a motor vehicle comprising:
   at least one oil pump (2) and an oil filter device (3, 31) for conveying oil from an oil sump (4) to:
      a primary oil circuit (6) having a primary pressure adjusted by a main pressure valve (5); and
      a secondary oil circuit (7) having a secondary pressure that is a proportion of the primary pressure;
   a variator (9, 10) and at least one shifting element (12, 13) connected with the primary oil circuit (6);
   a lubrication device (28) connected with the secondary oil circuit (7); and
   a converter unit (19) Including one of a hydrodynamic torque converter (20) with a converter lock-up clutch (21) and a hydrodynamic clutch with a lock-up clutch;
   the converter unit (19) being connected with a first oil line (23) and with a second oil line (25) connected with the primary oil circuit (6) and the secondary oil circuit (7) such that
      when the converter unit (19) is in a torque transmission state, the lock-up clutch is supplied with a minimum pressure required for torque transmission through the primary oil circuit (6) and the lubrication device (28) is provided with oil through the secondary circuit (7); and
      when the converter unit (19) is in the open state, the lock-up clutch is provided with oil through the secondary oil circuit (7).

10. An oil supply system for an automatic transmission of a motor vehicle comprising:
    at least one oil pump (2) and an oil filter device (3, 31) for conveying oil from an oil sump (4) to:
       a primary oil circuit (6) having a primary pressure adjusted by a main pressure valve (5); and
       a secondary oil circuit (7) having a secondary pressure that is a proportion of the primary pressure;
    a variator (9, 10) and at least one shifting element (12, 13) connected with the primary oil circuit (6);
    a lubrication device (28) connected with the secondary oil circuit (7); and
    a converter unit (19) including one of a hydrodynamic torque converter (20) with a converter lock-up clutch (21) and a hydrodynamic clutch with a lock-up clutch;
    the converter unit (19) being connected with a first oil line (23) and with a second oil line (25) connected with the primary oil circuit (6) and the secondary oil circuit (7) such that
       when the converter unit (19) is in a torque transmission state, the lock-up clutch is supplied with a minimum pressure required for torque transmission through the primary oil circuit (6) and the lubrication device (28) is provided with oil through the secondary circuit (7);
       when the converter unit (19) is in the open state, the lock-up clutch is provided with oil through the secondary oil circuit (7);
       the converter unit (19) is connected to a converter pressure valve (22) through the first oil line (23),
       the look-up clutch is connected to a converter clutch valve (24) through the second oil line (25), and
       the converter pressure valve (22) and converter clutch valve (24) are interconnected with the first oil circuit (6) and the second oil circuit (7) and are controlled by a pressure shifting valve (40) according to an operating state of the converter unit (19), such that the lubricating device (28) is provided with oil from the secondary oil circuit (7), and
       the lock-up clutch is provided with oil from the primary oil circuit (6) when the converter unit (19) is in a torque transmission operating state and with oil from the secondary oil circuit (7) when the converter unit (19) is in an open operating state.

* * * * *